US009424355B2

(12) United States Patent
Frumin

(10) Patent No.: US 9,424,355 B2
(45) Date of Patent: Aug. 23, 2016

(54) SYSTEMS AND METHODS FOR COORDINATED CONTENT DISTRIBUTION

(71) Applicant: FMM Ventures LLC, Seattle, WA (US)

(72) Inventor: Dan Yoel Frumin, Seattle, WA (US)

(73) Assignee: FMM Ventures LLC, Seattle, WA (US)

(*) Notice: Subject to any disclaimer, the term of this patent is extended or adjusted under 35 U.S.C. 154(b) by 0 days.

(21) Appl. No.: 14/528,942

(22) Filed: Oct. 30, 2014

(65) Prior Publication Data
US 2015/0058396 A1    Feb. 26, 2015

Related U.S. Application Data

(63) Continuation of application No. 13/473,452, filed on May 16, 2012, now abandoned.

(60) Provisional application No. 61/486,335, filed on May 16, 2011, provisional application No. 61/486,756, filed on May 16, 2011.

(51) Int. Cl.
*G06F 17/30* (2006.01)
*H04L 29/08* (2006.01)

(52) U.S. Cl.
CPC ... *G06F 17/30864* (2013.01); *G06F 17/30094* (2013.01); *G06F 17/30575* (2013.01); *G06F 17/30876* (2013.01); *H04L 67/1097* (2013.01); *G06F 17/30321* (2013.01)

(58) Field of Classification Search
CPC ............ G06F 17/30864; G06F 17/30345; G06F 17/30539; G06F 17/30589; G06F 17/3089; G06F 17/30038; G06F 17/30289; G06F 17/30887; G06F 17/30; G06F 17/30011; G06F 17/30029; G06F 17/30035; G06F 17/3004; G06F 17/30047; G06F 17/3005; G06F 17/30206; G06F 17/30312; G06F 17/30554; G06F 17/30705; G06F 17/30775; G06F 17/3082; G06F 17/30867; G06F 17/30873
USPC ........................................................ 707/736
See application file for complete search history.

(56) References Cited

U.S. PATENT DOCUMENTS

| | | | |
|---|---|---|---|
| 8,024,337 B1 | 9/2011 | Baluja et al. | |
| 8,311,382 B1 | 11/2012 | Harwell et al. | |
| 8,407,200 B2 * | 3/2013 | Wable | G06F 17/30867 707/706 |
| 8,452,779 B1 * | 5/2013 | Kelley | G06F 17/30864 707/736 |
| 2005/0182750 A1 | 8/2005 | Krishna et al. | |
| 2011/0314516 A1 * | 12/2011 | Li | G06F 21/606 726/3 |
| 2012/0158935 A1 * | 6/2012 | Kishimoto | G06Q 50/01 709/223 |
| 2013/0006980 A1 | 1/2013 | Frumin | |

* cited by examiner

*Primary Examiner* — Jean M Corrielus
*Assistant Examiner* — Andalib Lodhi
(74) *Attorney, Agent, or Firm* — KPPB LLP

(57) ABSTRACT

Systems and methods in accordance with embodiments of the invention coordinate the distribution of content by multiple users on a variety of distribution platforms. One embodiment includes a coordination server system, where the coordination server system is configured to query a coordination database, wherein the coordination database includes: a source account; a repeater account including access information enabling access via a distribution platform to a user account maintained by the distribution platform; content associated with the source account; a distribution rule associated with the content; wherein the coordination server system is configured to: associate uploaded content with the source account in the coordination database; and post the content in a user account associated with the repeater account via a distribution platform using access information associated with a repeater account according to the distribution rule.

19 Claims, 9 Drawing Sheets

SYSTEMS AND METHODS FOR COORDINATED CONTENT DISTRIBUTION

CROSS-REFERENCE TO RELATED APPLICATIONS

The current application claims priority as a continuation to U.S. patent application Ser. No. 13/473,452 entitled "Systems and Methods for Coordinated Content Distribution", filed May 16, 2012, which claims priority to U.S. Provisional Application No. 61/486,335, filed May 16, 2011, and U.S. Provisional Application No. 61/486,756, filed May 16, 2011. The disclosures of U.S. patent application Ser. Nos. 13/473,452, 61/486,335 and 61/486,756 are hereby incorporated by reference herein in its entirety.

FIELD OF THE INVENTION

The present invention relates generally to content distribution and more specifically to coordinated content distribution over a network.

BACKGROUND OF THE INVENTION

Many companies include a sales force to interact with a company's customers. Members of this sales force may utilize social networking services to distribute content, such as advertisements, to customers. Social networking services are typically an online platform for enabling communication between people that are members of the online social network. Examples of social networking services include the Facebook service provided by Facebook, Inc. located in Menlo Park, Calif., the Twitter service provided by Twitter, Inc. located in San Francisco, Calif. and the LinkedIn service provided by LinkedIn Corporation located in Mountain View, Calif.

Typically, a user of a social networking service generates a user or member account. The user account is typically maintained in a database of the online social networking service platform. The online social networking service can be configured to receive content and associate the content with a user account in the database. The online social networking service can also be configured to provide access the content associated with a user account either directly via a user interface provided by the online social network or indirectly via an Application Programming Interface (API).

SUMMARY OF THE INVENTION

Systems and methods in accordance with embodiments of the invention coordinate the distribution of content by multiple users on a variety of distribution platforms. One embodiment includes a coordinated content distribution system, including: a source computing device configured to run a source application; a repeater computing device configured to run a repeater application; a distribution platform configured to query a distribution database; a coordination server system configured to query a coordination database; a network, where the source computing device, repeater computing device, coordination server and distribution platform are configured to communicate via the network; where the distribution database is configured to store: at least one user account; and content posted to at least one user account; where the distribution platform is configured to provide access to content posted to a user account; where the coordination database includes: at least one source account; at least one repeater account including access information enabling access via the distribution platform to at least one user account maintained in the distribution database; content associated with at least one source account; at least one distribution rule associated with the content; where the coordination server system is configured to: receive uploaded content and to associate the uploaded content with at least one source account in the coordination database; and post content in at least one user account associated with the repeater account via the distribution platform according to at least one distribution rule.

In a further embodiment, the distribution rule includes a distribution schedule that defines when content is posted to a user account.

In another embodiment, the distribution rule includes a distribution trigger which defines an event, where content is posted to a user account upon the occurrence of the event.

In a still further embodiment, the coordination database includes at least one set of modification permissions associated with the content.

In still another embodiment, the coordination server system is configured to receive modifications to the uploaded content and to associate the modified content with at least one repeater account in the coordination database.

In a yet further embodiment, the coordination database includes modified content associated with at least one repeater account, where the modified content is a modified version of the content associated with the at least one source account and the coordination server system is configured to post the modified content in at least one user account in the distribution platform.

In yet another embodiment, the coordination server system is configured to receive a distribution rule and associate the distribution rule with content in the coordination database.

In a further embodiment again, the coordination server system is configured to receive modification permissions and to associate the modification permissions with uploaded content in the coordination database.

In another embodiment again, the coordination server system is configured to post modifications to the at least one user account associated with the repeater account via the distribution platform.

A further additional embodiment includes at least one user device configured to access the posted content in a user account via the content distribution platform.

In another additional embodiment, the distribution platform is selected from the group consisting of a telephone switch and a server system.

In a still yet further embodiment, the content posted to the at least one user account associated with the repeater account via the distribution platform is generated dynamically by inserting information into a template.

In still yet another embodiment, the coordination server system is configured to track interactions with content.

In a still further embodiment again, the posted content includes unique identifying information that enables a coordination server system to track interactions with the posted content.

In a still another embodiment again, the coordination database includes additional content accessible from a link included in the posted content in at least one user account.

In a still further additional embodiment, the additional content is generated dynamically using a template.

In still another additional embodiment, the link is selected from the group consisting of a URL, a button or a number in an interactive voice response system.

In a yet further embodiment again, the content posted to at least one user account is configured to generate at least one request for additional content from the coordination server system upon access, where the request includes the unique identifying information In yet another embodiment again, the additional content is generated dynamically by inserting information into a template, where at least one piece of information inserted into the template is selected based upon the unique identifying information included in the request.

In a yet further other embodiment, the network is the Internet.

In a yet further additional embodiment, a coordination server system, includes: at least one coordination server; a coordination database, where the at least one coordination server is configured to query the coordination database, where the coordination database includes: at least one source account; at least one repeater account including access information enabling access via a distribution platform to at least one user account maintained by the distribution platform; content associated with at least one source account; at least one distribution rule associated with the content; where the coordination server system is configured to: receive uploaded content and to associate the uploaded content with at least one source account in the coordination database; and post the content in the at least one user account associated with the repeater account via a distribution platform using access information associated with a repeater account according to the at least one distribution rule.

In yet another additional embodiment, a method for coordinated content distribution includes: receiving uploaded content at a coordination server system; associating uploaded content with a source account stored in a coordination database of the coordination server system; receiving at least one distribution rule using the coordination server system; associating the at least one distribution rule with content stored in the coordination database; posting content into a user account stored within a distribution database of a distribution platform according to at least one distribution rule using the coordination server system, where the distribution platform is configured to provide access to posted content in the user account.

DETAILED DISCLOSURE OF THE INVENTION

Figure 1:
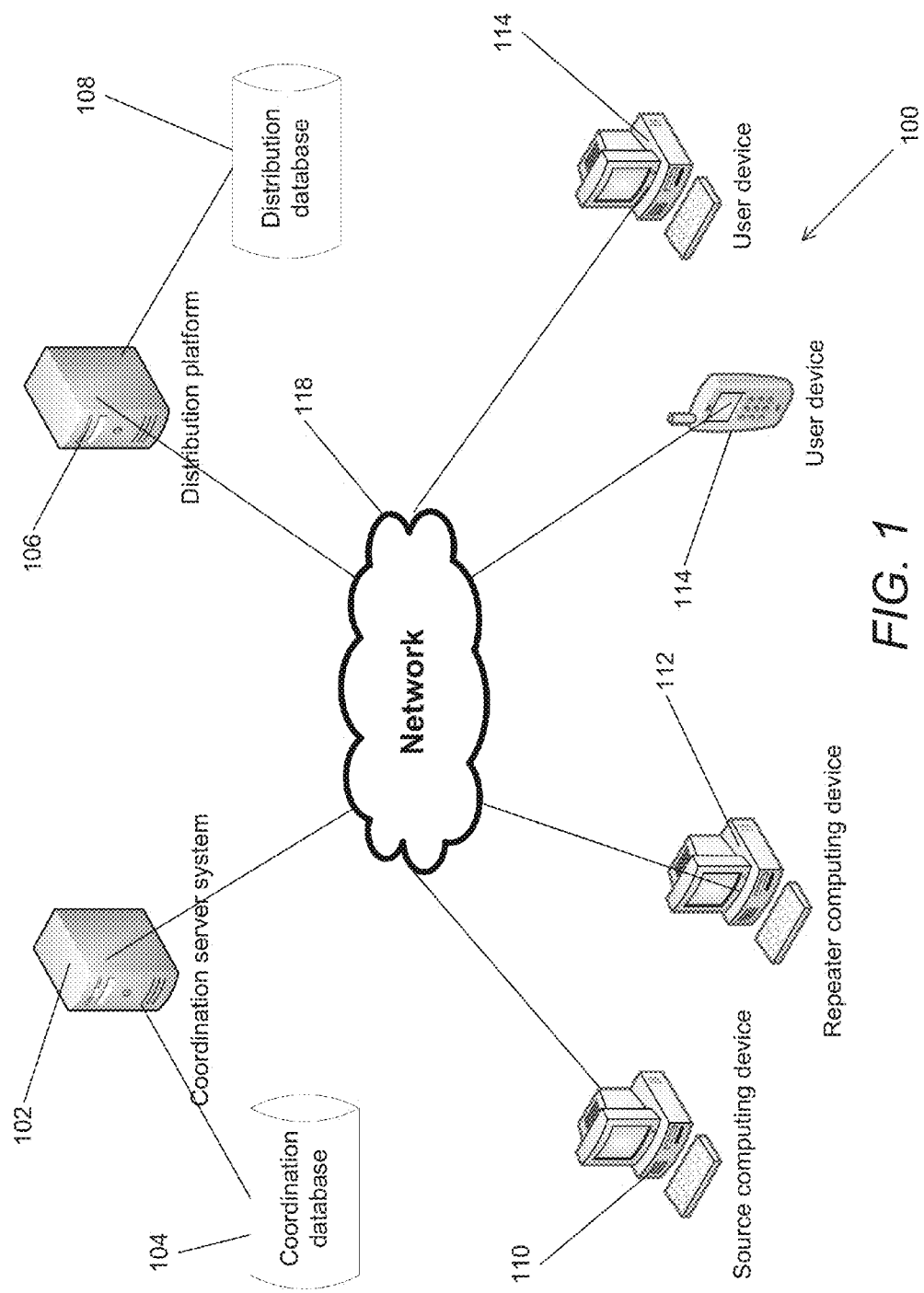
FIG. 1 illustrates a system for coordinated content distribution over a network in accordance with an embodiment of the invention.

Turning now to the drawings, systems and methods for coordinated content distribution in accordance with embodiments of the invention are illustrated. In many embodiments, a system for coordinated content distribution includes a coordination server system to coordinate the distribution of content by multiple users on a variety of distribution platforms. These users can upload content, modify content, set distribution rules that dictate how content is distributed and set modification permissions dictating how content can be modified. Content can be any kind of published information accessible to users in any form, including but not limited to audio, video, text and/or associated metadata. The content can span uploaded content and modified content stored in the distribution server system, posted content (which can be uploaded content or modified content) by a coordination server system into a user account maintained by the distribution platform and additional content (which also can, but need not be uploaded content or modified content) maintained in a coordination server system or provided by a third party which is accessible to users due to a link embedded in the posted content. The link is any association between additional and posted content that enables users to access additional content upon accessing posted content, including but not limited to a URL link. Content can also be static or dynamic, where dynamic content can be generated based upon a template that can be updated dynamically with other content (such as by pulling updated date and time information into content where the content is information referring to an upcoming event).

In several embodiments, a user can be any entity capable of generating, modifying, viewing or using content. In many embodiments, users can include, but are not limited to an organization such as a corporation or group of individuals or simply an individual. A coordination server system or a distribution platform can store information related to that user or deal with the user in an anonymous fashion (such as a temporary guest user). Therefore, in certain embodiments, different individuals can constitute the same user (such as the case of a user that is a corporation), or the same individual can constitute different users (such as where different users have different roles and/or authorizations such as for uploading content or modifying uploaded content).

In many embodiments, users referred to as sources can upload content to the coordination server system and other users that can be referred to as repeaters can utilize the coordination server system to distribute content via distribution platforms, on which the repeaters have access (via access information) to user accounts. In particular embodiments, these user accounts maintained by the distribution platform need not be owned by the repeater and may be accounts associated with any type of entity, corporate or individual, real or fictional. In certain embodiments, the repeater or the source can be temporarily associated with the coordination server system as a one-time user where information concerning the repeater or the source is not retained by the coordination server system. In many embodiments, users can access the coordination server system utilizing any kind of device. In certain embodiments, the same device can be utilized by a repeater and a source. Modified content is generated using original content uploaded by a source to the coordination server system that is subsequently modified by a repeater using the coordination server system. Modified content may be further modified by other repeaters. In certain embodiments, a repeater can become a source for subsequent repeaters where a repeater can associate further modification permissions and/or distribution rules that affects other repeater's generation of modified content.

In many embodiments, distribution rules can be associated with content and dictate how content is accessible to users. Distribution rules can include a distribution schedule that schedules times that content is made accessible to users or a distribution trigger that provides a condition that once satisfied allows content to be made accessible to users. Distribution triggers can include a user action (such as ad hoc repeater authorization to make content accessible to users), an event internal to the coordination server system (such as the posting of another message or the $100^{th}$ download of additional content), an event external to the coordination server system (such as upon a candidate winning an election) or a condition based upon an analysis of data within a coordination database or a third party system (such as upon the initiation or completion of a sales campaign or the successful closure of a new sales opportunity). In certain embodiments, distribution rules determine how content is posted to a user account. Distribution rules can also regulate the particular distribution platforms that content can be posted to. Distribution rules can affect a coordination server system by determining how content is posted to a user account maintained by a distribution platform (such as according to a distribution schedule, or distribution trigger for posting content), how a distribution platform allows users to access the posted content within a user account (such as according to a distribution schedule, or distribution trigger for a distribution platform), and even how additional content linked to by posted content is accessible to users (such as by a distribution schedule, or distribution trigger for additional content). In a particular embodiment, a distribution rule can dictate a time that a coordination server system can post content to a number of user accounts in a number of distribution platforms, when the posted content is then made accessible to users and when additional content linked to from the posted content is made accessible to users. In certain embodiments, distribution rules can automatically schedule particular content to be accessible at certain intervals (such as where a coordination server system intelligently determines the best way to post content, including but not limited to where a coordination server system posts content at regular intervals based upon analytics of the tracked interactions with the content where the content can vary at different intervals or the intervals can vary with the same posted content). Furthermore, distribution rules can also govern how distribution platforms make content available for users. However, any distribution rule can govern how content is distributed in accordance with different embodiments of the invention to comply with the requirements of specific applications.

In several embodiments, modification permissions are associated with content and dictate how content can be modified. When a source uploads content, the coordination server system can enable the source to specify modification permissions that define the manner and/or extent to which a repeater can modify the uploaded content. Similarly, the coordination server system can also allow the specification of modification permissions that enable repeaters to include further modification permissions that affect how other repeaters can generate modified content.

In a number of embodiments, the coordination database of the coordination server system stores access information for each distribution platform that a repeater associates with their account on the coordination server system. In many embodiments, access information is any information that enables a coordination server system to access a user account maintained in a distribution database, such as by posting content into that user account from which a distribution platform enables access to the posted content. In certain embodiments, access information is not stored in the coordination database but is provided from an external source as needed, such as but not limited to by providing access information only when a coordination server system is about to post content to a user account in a distribution platform. In several embodiments, a repeater can specify a distribution rule such as the distribution platforms that can be utilized by the coordination server system to distribute specific pieces of content.

In several embodiments, a distribution platform is any platform that enables users to access posted content utilizing a device, such as but not limited to websites, online social networks, servers considered to distribute short messages, voicemail systems, emails, online advertising networks, user profile updates and/or any other system that can associate content with an account in a way that makes the content accessible to other users. In certain embodiments, a distribution platform can be as broad as enabling users to access content presented in a virtual universe of a massively multiplayer online game in a manner accessible by players of the game, such as a written message embedded in the landscape of the virtual universe or with a status message associated with the user, or even on an accessory (e.g. a shield, armor or clothes) of the user's avatar.

In many embodiments, interactions with content made accessible to users by distribution platforms can be tracked by a coordination server system. In several embodiments, content can include unique identifying information that the coordination server system can use to track interactions with content, including but not limited to the manner in which the content was distributed. For example, the content can include a unique URL that identifies the repeater that distributed the content and/or the distribution platform from which the content was distributed. In many embodiments, the unique URL includes information concerning the date and time on which the content was distributed, the repeater and/or repeater device that modified and/or approved the content, the date and time that the content was accessed, the amount of times that the content was accessed, the identity of the source that uploaded content, the source device utilized to upload content, the date/time of content upload, the date/time that content was modified and/or approved for posting into a user account by a repeater and any type of information that can be tracked using a URL. In several embodiments, the coordination server system can also collect information from the device requesting content such as (but not limited to) geographic information, profile information, event registration information, employment history, profile pictures and/or any other information that may be available concerning the individual viewing the distributed content.

Although much of the discussion of embodiments of the invention involve coordinated content distribution, systems and methods in accordance with embodiments of the invention can similarly use access information for distribution platforms to update any aspect of a user account maintained on a distribution platform including (but not limited to) settings associated with the account, ecommerce activity, event registration, job titles, status updates and social networking account information. Accordingly, the discussion of systems and methods for coordinated content distribution should be understood as being equally relevant to the coordinated updating of any user account data on a distribution platform and not limited to simply the posting of content to a user account. Coordinated content distribution in accordance with embodiments of the invention is discussed further below.

Coordinated Content Distribution Systems

Coordinated content distribution systems in accordance with many embodiments of the invention can coordinate distribution of content via one or more distribution platforms. A coordinated content distribution system in accordance with an embodiment of the invention is illustrated in FIG. 1. The system 100 includes a coordination server system 102 including a coordination database 104, a distribution platform 106 including a distribution database 108, a source computing device 110, a repeater computing device 112 and user devices 114 all interconnected via a network 118. In many embodiments, the network 118 is the Internet.

In several embodiments, the coordination database can include a number of accounts associated with sources referred to as source accounts and/or a number of accounts associated with repeaters referred to as repeater accounts. As discussed above, a repeater account may be a source account and vice versa in certain embodiments due to the interchangeability of repeaters and sources. The coordination server system can query the coordination database and associate or retrieve data from a source account and/or a repeater account. Similarly, a distribution platform can include a distribution database which the distribution server can query. The distribution database can include a number of user accounts from which the distribution platform can retrieve data and with which the distribution platform can associate data.

In several embodiments, sources can interact with a coordination server system utilizing a source device running a source application, such as (but not limited to) a web browser application running on a personal computing device logged into the coordination server system via a source account maintained in the coordination database. Similarly, repeaters can interact with a coordination server system utilizing a repeater device running a repeater application, such as (but not limited to) a web browser application running on a personal computing device logged into the coordination server system via a repeater account maintained in the coordination database. In certain embodiments, the source account or repeater account can be temporary and not stored after a transaction with a source or repeater is complete.

In many embodiments, a source using a source application running on a source device can upload content to the coordination server system. In addition to uploading the content, the source can also upload additional information associated with the content such as but not limited to modification permissions defining how repeaters can modify content (such as specifying which repeaters can modify the content) and distribution rules defining how content is distributed and made accessible to users (such as the user accounts on a distribution platform to which content can be posted).

In various embodiments, a repeater using a repeater application running on a repeater device can modify the content uploaded by a source. When content is modified, the content can be referred to as modified content. In many embodiments, modified content is stored in the coordination database and associated with the repeater account responsible for the modifications. The manner in which content can be modified is governed by modification permissions (if any) associated with the content. The repeater can also provide access information that enables the coordination server system to post content into a user account on a distribution platform and/or post additional modifications to the user account including but not limited to settings of the user account. As discussed above, these user accounts maintained by the distribution platform need not be owned by the repeater and may be accounts associated with any type of entity, corporate or individual, real or fictional. In addition, the user account may take the form of a group page, discussion forum, and/or any other way of associating information on a distribution platform. In certain embodiments, a repeater can be authorized by a source to generate modified content or can subscribe to content without a need to be authorized to generate modified content. As noted above, the concept of a user account is not limited to a single user's account, but includes group accounts such as (but not limited to a corporate account).

In numerous embodiments, a distribution platform can enable user devices to access posted content that is posted to a user account on the distribution platform. Posted content is posted in a user account on a distribution platform by a coordination server system that utilizes the access information provided from a repeater account. The distribution platform can enable user devices to access posted content where user devices initiate communication with the distribution platform (commonly referred to as a pull) or when the distribution platform initiates communication with user devices (commonly referred to as a push). Examples of distribution platforms include (but are not limited to) websites, online social networks, servers considered to distribute short messages, voicemail systems, emails, online advertising networks, user profile updates, status updates and/or any other system that can associate content with an account in a way that makes the content accessible to other users. Distribution platforms can include platforms that can operate over the Internet or any, public, private, physical or virtual network, such as a website that is on a public network like the Internet, a website that is on a private network like a corporate intranet, or a messaging service operating on a private virtual network.

In a variety of embodiments, interactions with content can be tracked by a coordination server system. In many embodiments, interactions with content can be tracked by a coordination server generating unique identifying information for each piece of content posted into a user account in a distribution platform which can be embedded within a link. The unique identifying information can be any information capable of identifying interactions with content, such as but not limited to information embedded in a URL link, a beacon, or cookies that can track both "clicks" as well as "views" of content. A link can optionally be any type of user interface that includes unique identifying information that results in a request for additional content (such as but not limited to a server) using unique identifying information. In numerous embodiments, a link can result in a request for a plurality of pieces of additional content or content can include several links embedded within the content. In certain embodiments, a link can be activated via a variety of mechanisms including (but not limited to) an interactive voice response, a physical button, a button on a user interface or anything with which a user can interact. Indeed, a link can optionally be viewed as any interactive mechanism that results in the distribution of additional content to a user. Thereby, the link can be used by the coordination server system to identify additional content to provide to the user device and the coordination server system can use unique identifying information in the content to identify the repeater that posted the content accessed by the user device and/or the distribution system to which the content was posted.

In many embodiments, by requesting the additional content from the coordination server system, the coordination server system has the ability to obtain additional information about the user device including its IP address/geographic location, and/or any other information that can be collected from the user device including (but not limited to) information contained within cookies within a web browser application. In addition to facilitating tracking of distributed content, the unique identifying information associated with the link can also be used in the dynamic generation of content in response to requests for additional content by a user device.

In numerous embodiments, content is dynamically generated using a template and information incorporated into the template from information found within the coordination server system or a third party system in response to a request for the content can be referred to as dynamic content. Dynamic content can span any type of content, including uploaded content, modified content, posted content or additional content. In certain embodiments, dynamic content is uploaded content that can be updated automatically using information from any of a variety of sources according to a template and posted in a user account maintained in a distribution database (such as a status update on an online social network). In certain embodiments, dynamic content can be utilized by a coordination server deploying updates to posted content based on distribution rules, such as but not limited to when a post is updated throughout the day (for example by the amount of money raised on a political campaign). In several embodiments, additional content is dynamic content stored as a template within the coordination database (or in a separate location) and the coordination server system dynamically inserts relevant information (e.g. the contact information for a sales representative that is geographically proximate the user or the contact information of the repeater that posted the content) into the template to generate the additional content provided to the user device requesting the additional content. In other embodiments, any of a variety of information can be dynamically inserted into a template content based upon unique identifying information contained within a link and/or information collected from/about a user device in accordance with embodiments of the invention. Thereby, in many embodiments, additional content stored in a coordination server system that is linked with posted content stored in a distribution database can be static or dynamic, where dynamic additional content is generated from a template that is used by a coordination server system to dynamically generate the additional content from any of a variety of sources of additional information as appropriate for a given application, such as but not limited to dynamic additional content that is dynamically generated from information found in a database that tracks total donations to a particular cause.

Although specific architectures for coordinated content distribution systems are discussed above with reference to FIG. 1, elements of a coordination content distribution system can function and interact in any of a variety of different ways appropriate to specific applications. Processes for performing coordinated content distribution and/or other forms of coordinated user account modification in accordance with embodiments of the invention are discussed further below.

Timing of Coordinated Content Distribution

Figure 2:
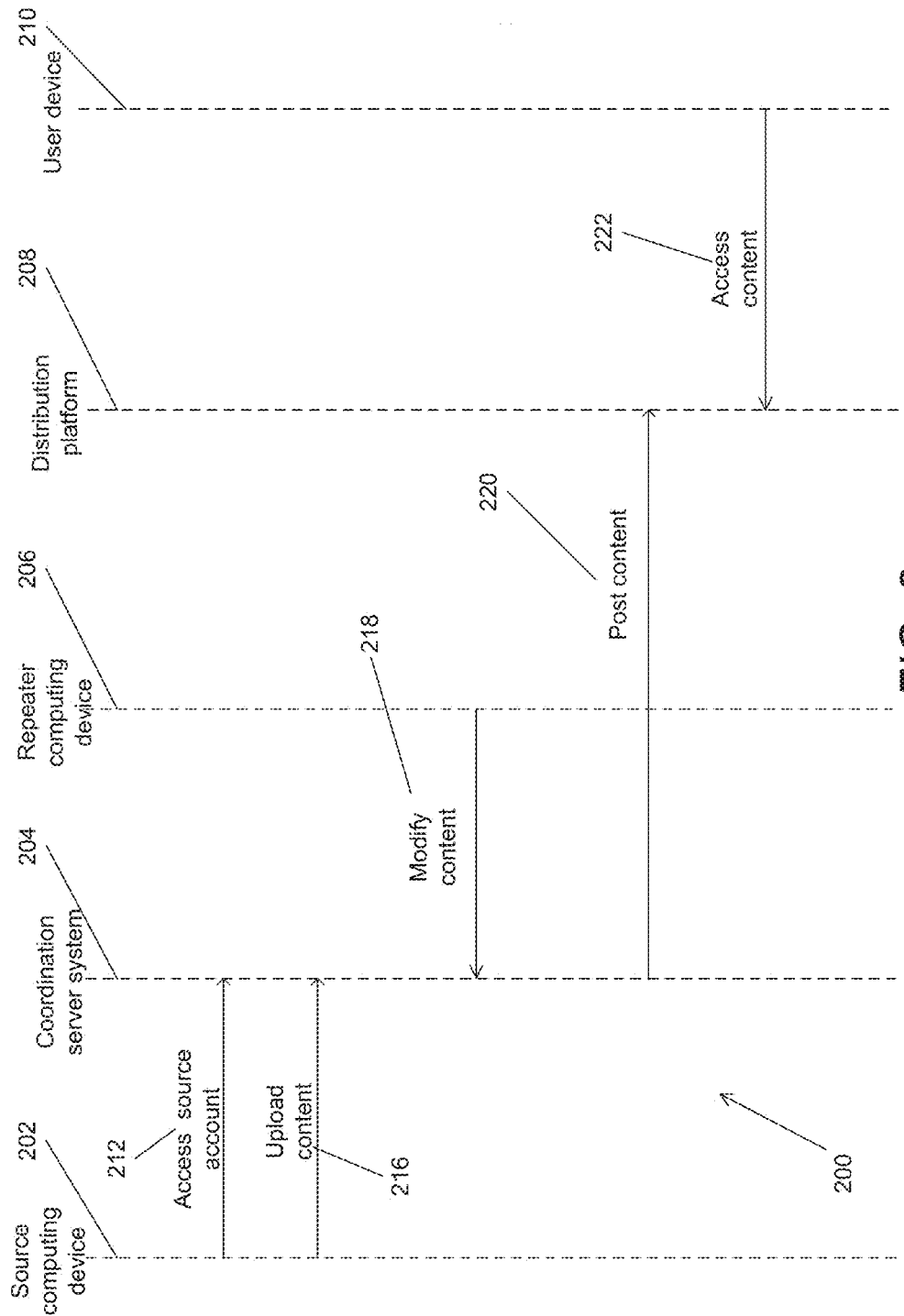
FIG. 2 is a timing diagram illustrating a process for coordinated content distribution in accordance with an embodiment of the invention.

Coordinated content distribution systems in accordance with many embodiments of the invention can utilize specific sequences of communication between components of the coordinated content distribution system. A timing diagram illustrating how components of a coordinated content distribution system interact in accordance with an embodiment of the invention is illustrated in FIG. 2. The timing diagram 200 includes a source computing device 202. The source computing device accesses (212) a coordination server system 204 by providing authentication information for a specific source account maintained within a coordination database by the coordination server system 204.

Figure 3:
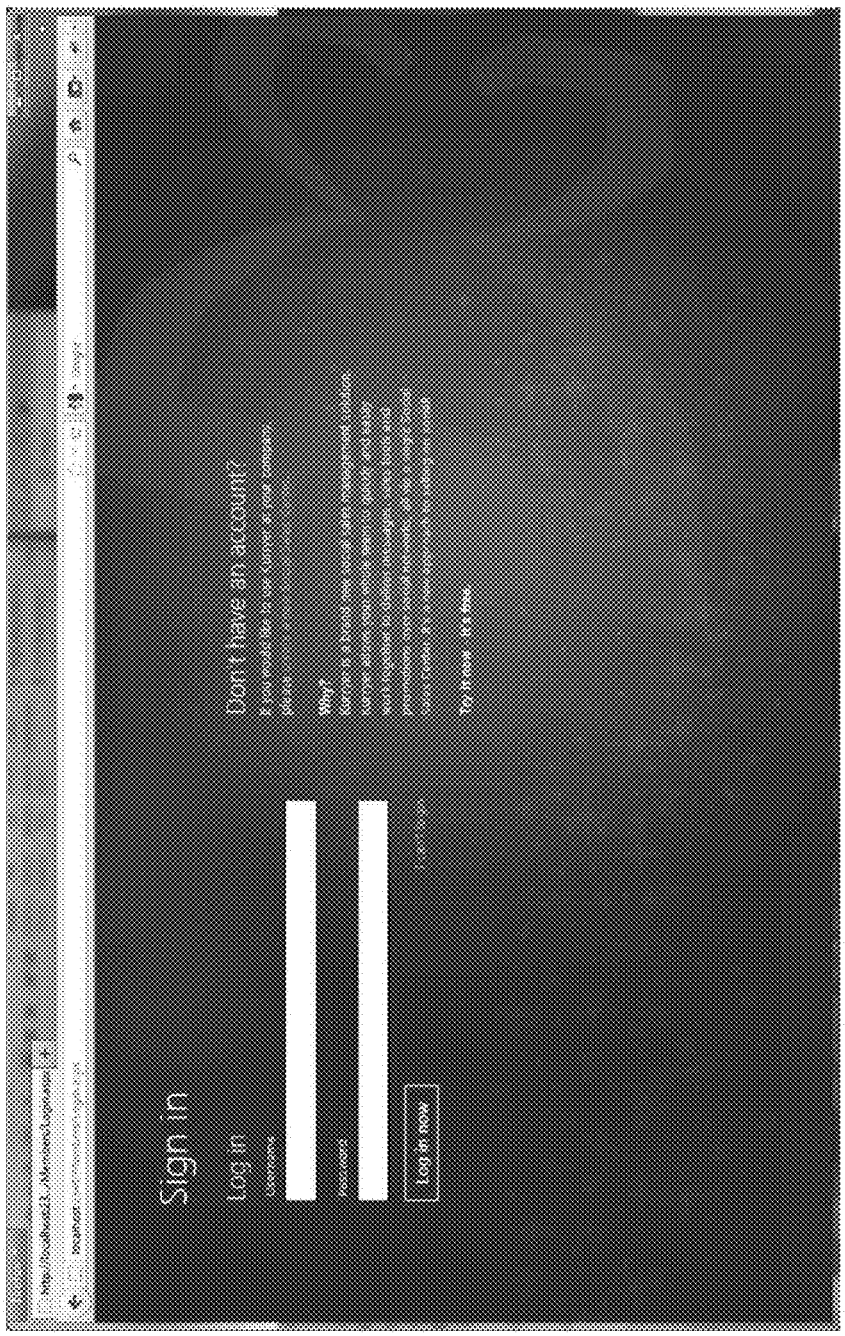
FIG. 3 is a screen shot of a login screen generated by a coordinated content distribution system in accordance with an embodiment of the invention.

A screen shot of a web page containing a user interface generated by a coordination server system for logging in to a source account maintained by the coordination server system in accordance with an embodiment of the invention is illustrated in FIG. 3. Access to a source account can be achieved through different processes in accordance with different applications including but not limited to an authentication process, such as providing authentication information such as a password associated with a source account that is authenticated by the coordinated server system.

After the source computing device 202 authenticates itself to the coordination server system 204, the source computing device 202 can provide (216) uploaded content to the coordination server system 204. The coordination server system 204 associates the uploaded content received from the source computing device with the source account. As discussed above, multiple sources can utilize the same source computing device. The uploaded content can be associated with a distribution rule defining how content is distributed and modification permissions defining the manner in which the content can be modified.

Figure 4:
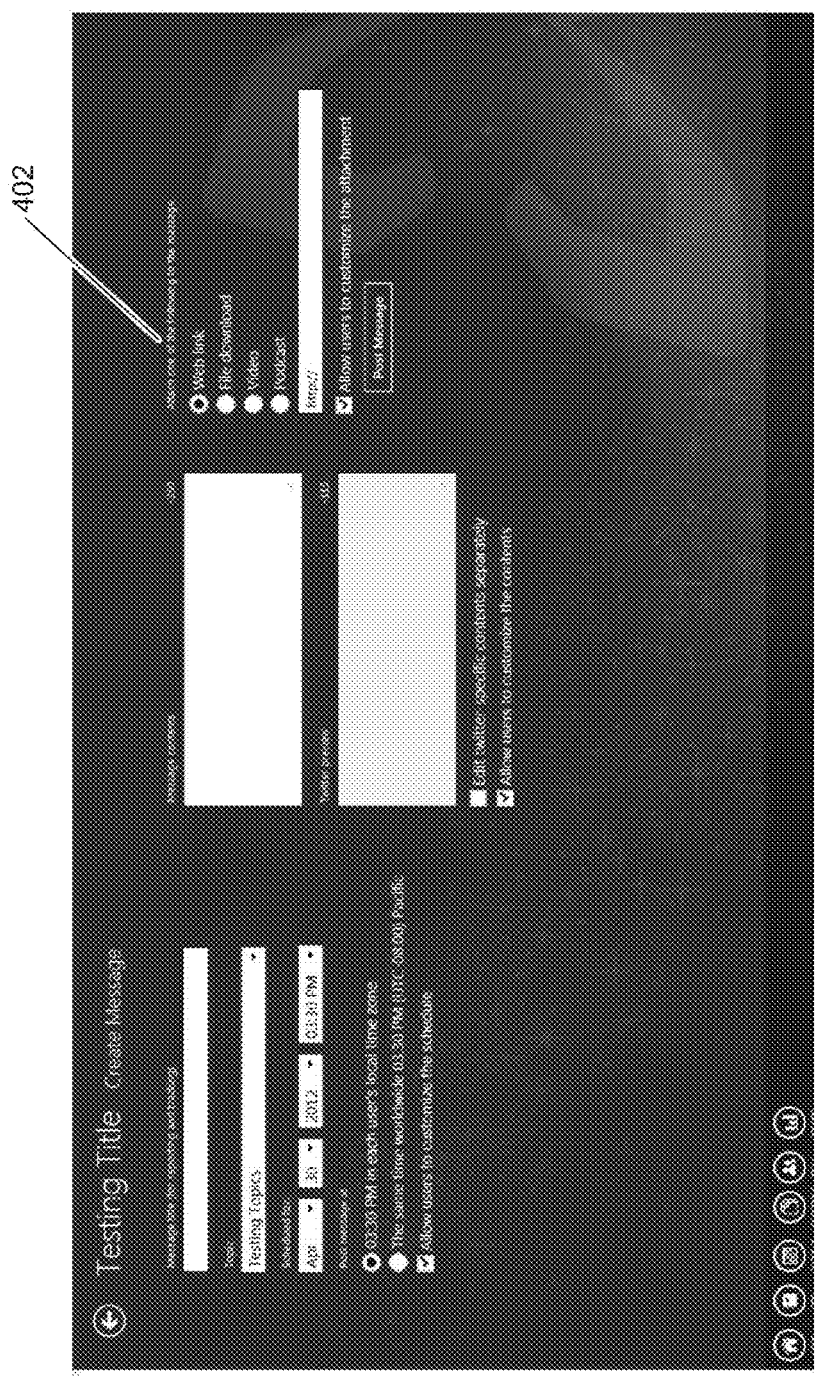
FIG. 4 is a screen shot of a user interface enabling uploading of content and for specifying modification permissions associated with the uploaded content generated by a coordinated content distribution system in accordance with an embodiment of the invention.

A screen shot of a user interface of a web browser where a source has accessed a source account and is able to provide content to the coordination server system in accordance with an embodiment of the invention is illustrated in FIG. 4. The illustrated embodiment includes a structured user interface 400 enabling a source to provide content with a title, category and a distribution rule, such as a distribution schedule. Additionally, a source can attach (402) content in different forms such as a web link, podcast or downloadable content. In many embodiments, accessing content such as a web link/URL enables a link to additional content in the coordination server system and communicates unique identifying information to the coordination server system from which the coordination server system is then able to track interactions with content. As discussed above, both additional content and posted content can be dynamically generated using a template. Dynamically generating additional content or posted content can ensure that content is fresh, such as content having the latest financial and analytical data, product and service information being correct, and there not being any broken URL links. Although a specific user interface is illustrated, any user interface appropriate to a specific application can be utilized in accordance with embodiments of the invention.

Referring back to FIG. 2, after the content is provided (216) to the coordination server system, the repeater computing device 206 can then provide instructions (218) to the coordination server system concerning modifications to the content and generate modified content. In many embodiments, the modification permissions determine how certain repeaters can generate modified content, such as the modifications that can be made to the content. When a repeater modifies content, the modified content is associated with the repeater's account within the coordination server system. A coordination server system can post (220) content (which can be modified content as well as uploaded content that is unmodified) to user account(s) on distribution platform(s) in accordance with one or more distribution rules originally specified for the content or a modified distribution rule(s) specified by the repeater. As noted above, the source can impose modification permissions on the manner in which a repeater can modify the one or more distribution rules associated with a piece of content, and a repeater can modify and/or add their own modification permissions and/or distribution rules to content. In many embodiments, the coordination server system does not provide a repeater with any opportunity to modify content or the one or more distribution rules associated with the content.

In several embodiments, the coordination server system 204 posts (220) content to one or more user accounts on one or more distribution platforms in accordance with at least one distribution rule (such as a distribution schedule or a distribution trigger) associated with the content using access information provided by repeaters and maintained in a coordination database by the coordination server system. Posting can involve providing content to the distribution platform and associating the content with a specific user account maintained by the distribution platform to generate posted content. In certain embodiments, the posted content can include a link to additional content maintained within the coordination database of the coordination server system and/or a third party system. In many embodiments, a coordination server system stores access information associated with a specific repeater account. The access information identifies a specific user account on the distribution platform. The access information also enables the coordination server system to authenticate that it is permitted to modify the user account and/or upload content to the user account. In this way, the coordination server system can authenticate itself to a distribution platform and post content and/or modify the user account identified by the access information on the content distribution platform.

User devices 210 can access (222) posted content via the distribution platform. In many embodiments, a user device 210 is able to access (222) a distribution platform 208, which queries a user account within a distribution platform 208 for content and provides that content to the user device 210. As discussed above, in certain embodiments, the posted content (which can be static or dynamic) in the user account of the distribution database can be linked to additional content stored in the coordination server system and/or a third party system. In particular embodiments, the posted content can be static or dynamic as well.

In several embodiments, the posted content includes unique identifying information that can be utilized by the coordination server system 204 to track interactions with content. In several embodiments, the types of interactions with posted content that are tracked include (but are not limited to) the distribution platform via which the content was accessed, the user account on the distribution platform from which the content was accessed, and/or the repeater account that the coordination server utilized to post the content to the user account on the distribution platform. The specific information that is tracked typically depends upon the requirements of an application (i.e. the granularity at which the coordination server system wishes to track distribution and access of content) and/or the information that can be extracted about a user device from interactions between the coordination server system and the user device, when the user device requests additional content. The coordination server system 204 can store interaction information for use in the generation of analytics related to the distribution of the content.

Although specific sequences of communication between components of a coordinated content distribution system are described above, any of a variety of processes can be utilized to exchange information to facilitate the coordinated distribution of content in accordance with embodiments of the invention. Processes performed by coordination server systems during the coordinated distribution of content are discussed below.

Coordinating Content Distribution Utilizing a Coordination Server System

Figure 5:
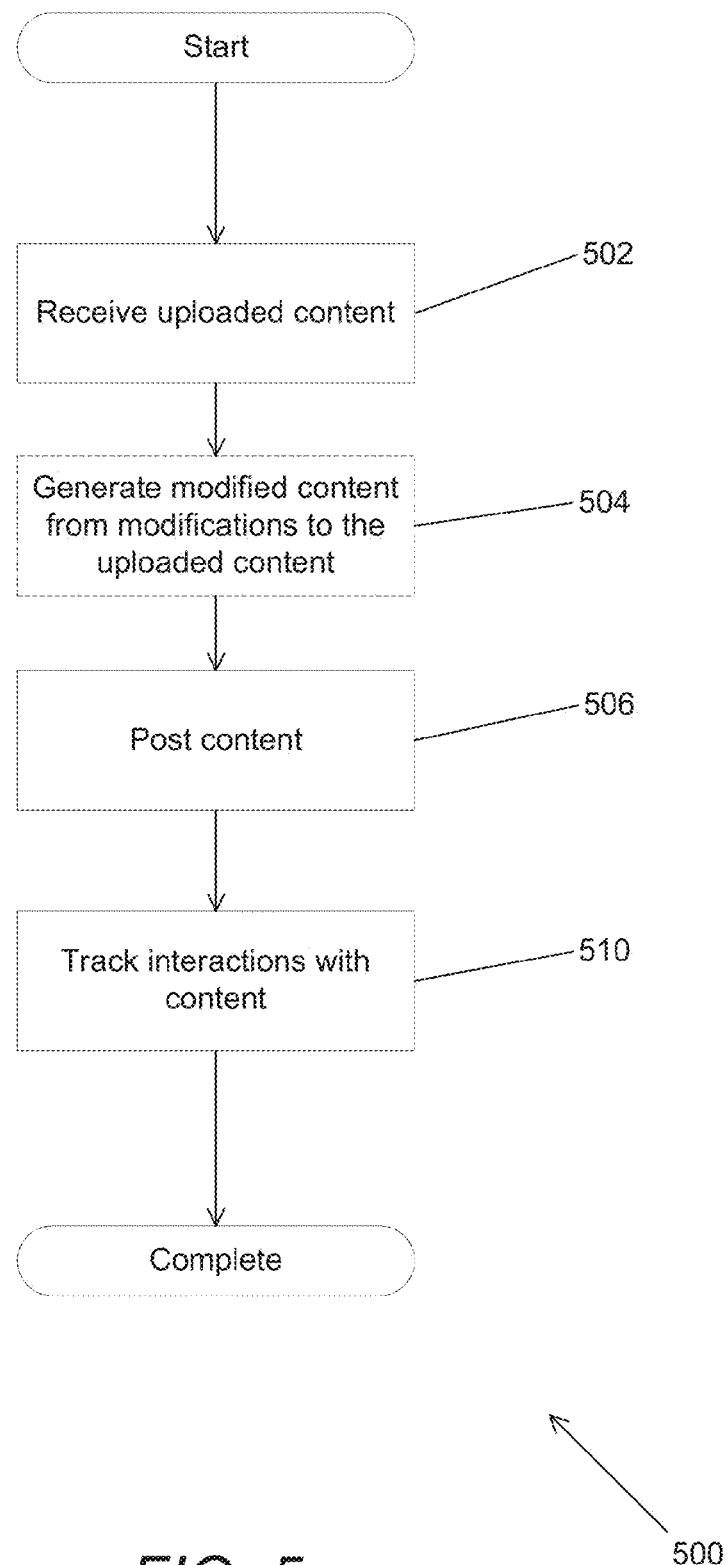
FIG. 5 illustrates a flow chart of a process for coordinated content distribution in accordance with an embodiment of the invention.

Coordination server systems in accordance with many embodiments of the invention coordinate the posting of content to a distribution platform from content maintained on the coordination server system. This posted content can be linked to additional content stored in the coordination server system and/or third party system accessible by users upon accessing the posted content. A process for coordinating content distribution utilizing a coordination server system in accordance with an embodiment of the invention is illustrated in FIG. 5. The process 500 includes the coordination server system receiving (502) uploaded content. After receiving (502) the uploaded content, the coordination server system may generate (504) modified content when a repeater requests modifications to the uploaded content. In many embodiments, modified content can be accessed by users as posted content maintained by a distribution platform and/or as additional content maintained by a coordination server system. In several embodiments, uploaded content that is unmodified can also be accessed by users as posted content maintained by a distribution platform and/or as additional content maintained by a coordination server system. Furthermore, content can be dynamic and updated via a template upon request by a user, such as but not limited to generating content on demand. As is discussed further below, modification permissions may be associated with content that govern the extent to which a repeater can make modifications to the uploaded content.

The coordination server system can post (506) content to a user account on a distribution platform so that the posted content can be accessed via the distribution platform. In particular embodiments, the content posted by the coordination server system depends upon whether a repeater account authorizes posting of the uploaded content or modified content. In certain embodiments, the generation (504) of modified content is optional (as indicated with a dotted line) as content without modification can be posted to a user account maintained within a distribution platform. The coordination server can also modify a user account on a distribution platform. These modifications can include modifying account settings and/or information associated with the user account or any other modification to a user account beyond simply posting content to the user account.

When content is posted (506) to a user account, interactions with the content can be tracked (510) by the coordination server system. As discussed above, posted content can be linked with additional content stored in a coordination server system and/or a third party system. In many embodiments, the links in the posted content can include unique identifying information associated with a specific repeater account, distribution platform and/or user account on a distribution platform. When the link is used to access the additional content, the coordination server system can utilize the unique identifying information to track interactions with content, including but not limited to determining the distribution platform via which the content was accessed, the user account on the distribution platform from which the content was accessed, and/or the repeater account that enabled the posting of the content to the user account on the distribution platform, the date and time on which the content was distributed, the repeater device that modified and/or approved the content, the date and time that the content was accessed, the amount of times that the content was accessed, the identity of the source that uploaded content, the source device utilized to upload content, the date/time of content upload, the date/time that content was modified and/or approved for posting into a user account by a repeater and any type of information that can be tracked using a URL. In several embodiments, the coordination server system can also collect information from the device requesting content such as (but not limited to) geographic information, profile information, event registration information, employment history, profile pictures and/or any other information that may be available concerning the individual viewing the distributed content and/or any other information that can be captured from a request for content by a user device. Furthermore, the coordination server system can also dynamically generate the additional content that is provided to the user device using information selected based upon a template and the unique identifying information contained within the link and/or information collected from/about the user device, where the information selected based upon a template can be any information such as but not limited to environmental factors including geography or time, and outside factors, including content management systems or databases.

Although a specific process for coordinating content distribution utilizing a coordination server system is discussed above, any process that distributes content utilizing a coordination server system can be utilized in accordance with many different embodiments of the invention. Content maintained within a coordination database is discussed in further detail below.

Restricting the Modification and Distribution of Uploaded Content

Coordination server systems in accordance with many embodiments of the invention can enable the distribution of content according to a distribution rule or modified according to modification permissions specified by a source or a repeater. A distribution rule and/or modification permissions can be specified at the time the content is uploaded to the coordination server system and/or modified after the content is uploaded and a repeater can modify and/or add their own modification permissions and/or distribution rules to content.

Figure 6:
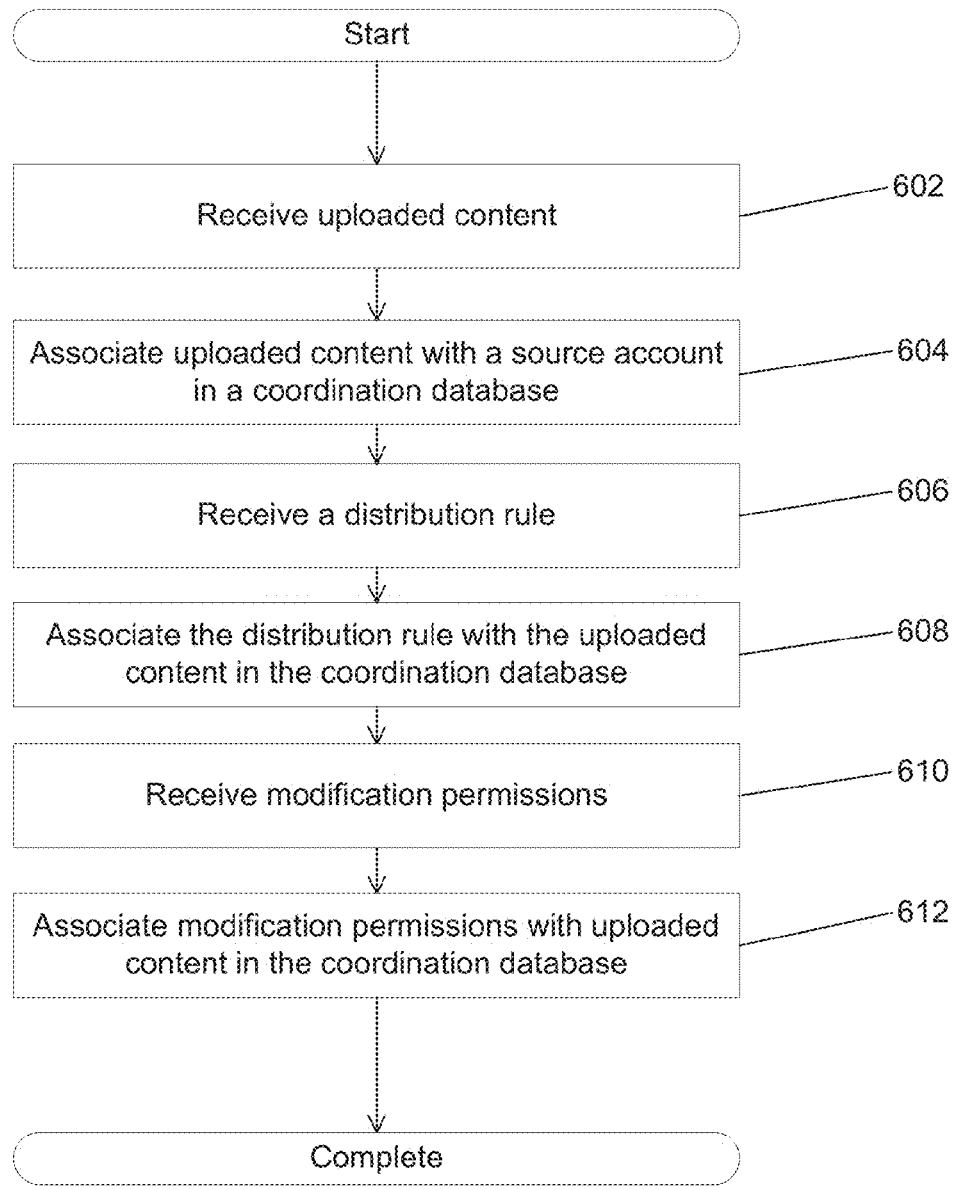
FIG. 6 illustrates a flow chart of a process for receiving uploaded content in accordance with an embodiment of the invention.

A process for uploading content for coordinated content distribution in which the rules that govern how content is distributed (via a distribution rule) and the extent to which uploaded content can be modified (via modification permissions) are specified by the source of the uploaded content in accordance with an embodiment of the invention is illustrated in FIG. 6. The process 600 includes a coordination server system receiving (602) uploaded content. The uploaded content can be associated (604) with a source account maintained in a coordination database by the coordination server system.

The coordination server system can also receive (606) a distribution rule with respect to uploaded content and associate (608) the distribution rule with the content in the coordination database. As discussed in greater detail above, a distribution rule can specify a distribution schedule (including but not limited to the time or time window(s)) or distribution trigger during which content can be made accessible. The distribution rule is used by the coordination server system to coordinate the posting of content to distribution platforms, so that user devices can access content via the distribution platforms in a manner compatible with the distribution schedule. In certain embodiments, distribution rules can dictate how content is distributed such as which distribution platforms may distribute the content and how particular distribution platforms may distribute the content. In particular embodiments, a distribution rule can come from a third party that is not a source or a repeater. In certain embodiments, a distribution rule can be a default distribution rule associated with content without being specified by a user.

The coordination server system can also receive (610) modification permissions. The modification permissions (610) define how the uploaded content can be modified. Modification permissions can limit or authorize modifications in any manner in which content can be modified including whether repeater accounts can set further distribution rules or modification permissions. When the coordination server system receives modification permissions, the coordination server system associates (612) the modification permissions with the content.

Although a specific process for uploading content to a coordination server system and for specifying modification permissions and distribution rules associated with the uploaded content is discussed above, any process for receiving content associated with a source account and for limiting the manner in which the content can be modified and distributed including (but not limited to) processes that limit the distribution of content geographically, demographically and/or in any other way that may be appropriate to a specific application can be utilized in accordance with embodiments of the invention. Processes for modifying uploaded content are discussed below.

Modifying Uploaded Content

A coordination server system in accordance with many embodiments of the invention can enable a repeater to modify content uploaded by a source prior to posting content into a user account on a distribution platform. In many embodiments, modified content includes uploaded content that is modified in accordance with modification permissions associated with the content and specified by the source. In many embodiments, repeaters can modify content in accordance with modification permissions that include the additional modification permissions. In several embodiments, modified content is stored separately from uploaded content that has not been modified and does not affect the original uploaded content. In particular embodiments, tracked interactions with content include whether content is modified or not as well as how content was modified from the original uploaded content (such as to enable a source to determine the quality of the uploaded content).

Figure 7:
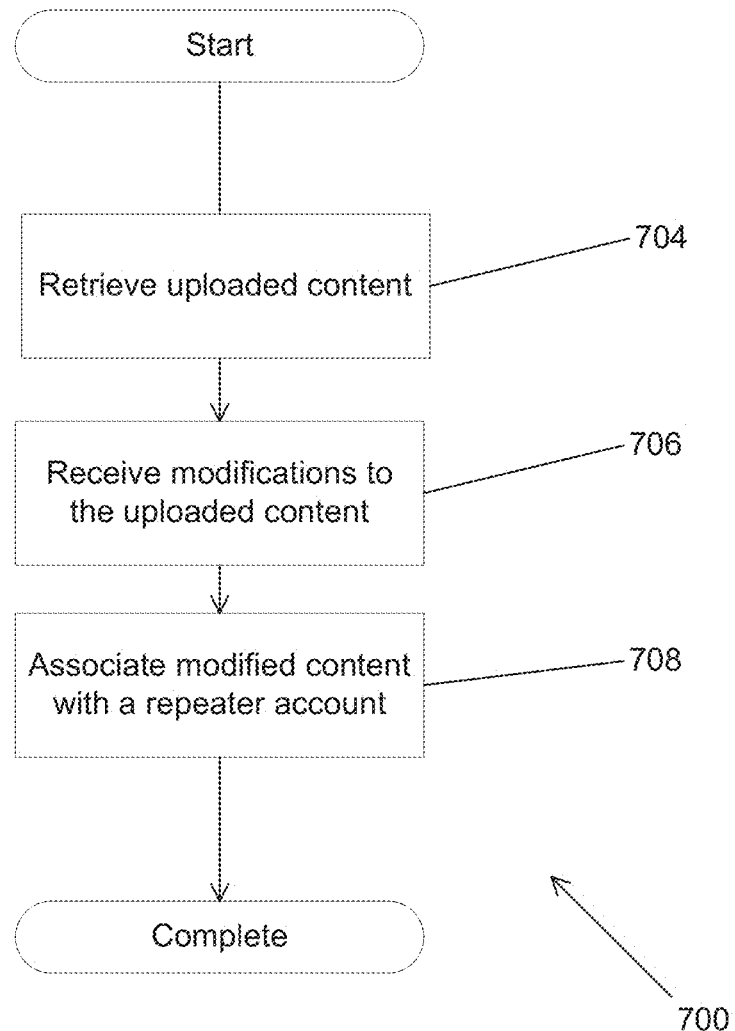
FIG. 7 illustrates a flow chart of a process for receiving modifications to uploaded content in accordance with an embodiment of the invention.

A process for modifying content uploaded to a coordination server system in accordance with an embodiment of the invention is illustrated in FIG. 7. The process 700 includes a coordination server system retrieving (704) uploaded content. After retrieving uploaded content, the coordination server can receive (706) modifications to the uploaded content. The modified content can also include distribution rules and modification permissions. When modified content is generated, the modified content can be associated (708) with the repeater account responsible for the modifications.

Although a specific process for modifying content uploaded to a coordination server system is discussed above, any process for modifying uploaded content can be utilized in accordance with embodiments of the invention. Processes for distributing uploaded and/or modified content are discussed below.

Posting Content to Distribution Platforms

Figure 8:
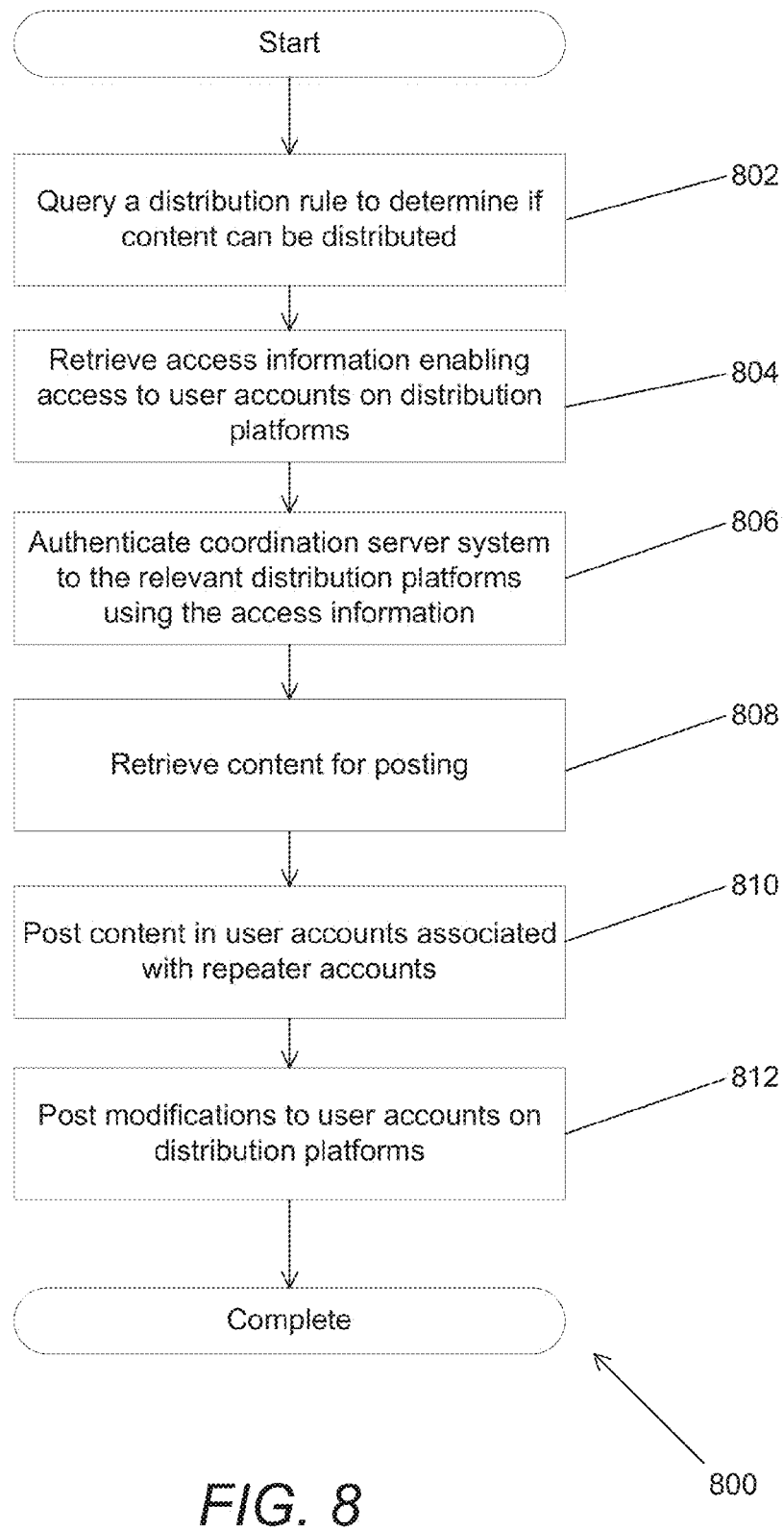
FIG. 8 illustrates a flow chart of a process for posting content in accordance with an embodiment of the invention.

A coordination server system in accordance with many embodiments of the invention can post content to and/or modify user accounts on one or more distribution platforms utilizing access information authorizing access to the user accounts. A process for posting content to and/or modifying a user account on a distribution platform in accordance with an embodiment of the invention is illustrated in FIG. 8. The process 800 includes a coordination server system querying (802) a distribution rule associated with content to determine if content can be distributed. In many embodiments, a distribution rule regulates how the content is distributed. When the requirements of the distribution rule are satisfied, such as when a scheduled time to post content arrives according to a distribution schedule or upon occurrence of a distribution trigger, the coordination server system retrieves (804) access information enabling access via the distribution platform to a user account to which the content is to be distributed. After retrieving (804) the access information, the coordination server system can authenticate (806) itself with the relevant distribution platform using the access information. The coordination system retrieves (808) the appropriate content (including uploaded content and modified content) for posting and posts (810) the content to the user account on the distribution platform. The distribution platform can then provide user devices with access to the posted content. The coordination server system can also post (812) modifications to the user account (in addition to or as an alternative to posting content), such as but not limited to modifying settings or information associated with the user account.

Although specific processes for posting content to and/or modifying a user account on a distribution platform are discussed above, any of a variety of processes can be utilized for posting content to a user account in accordance with embodiments of the invention.

Tracking Interactions with Content

Figure 9:
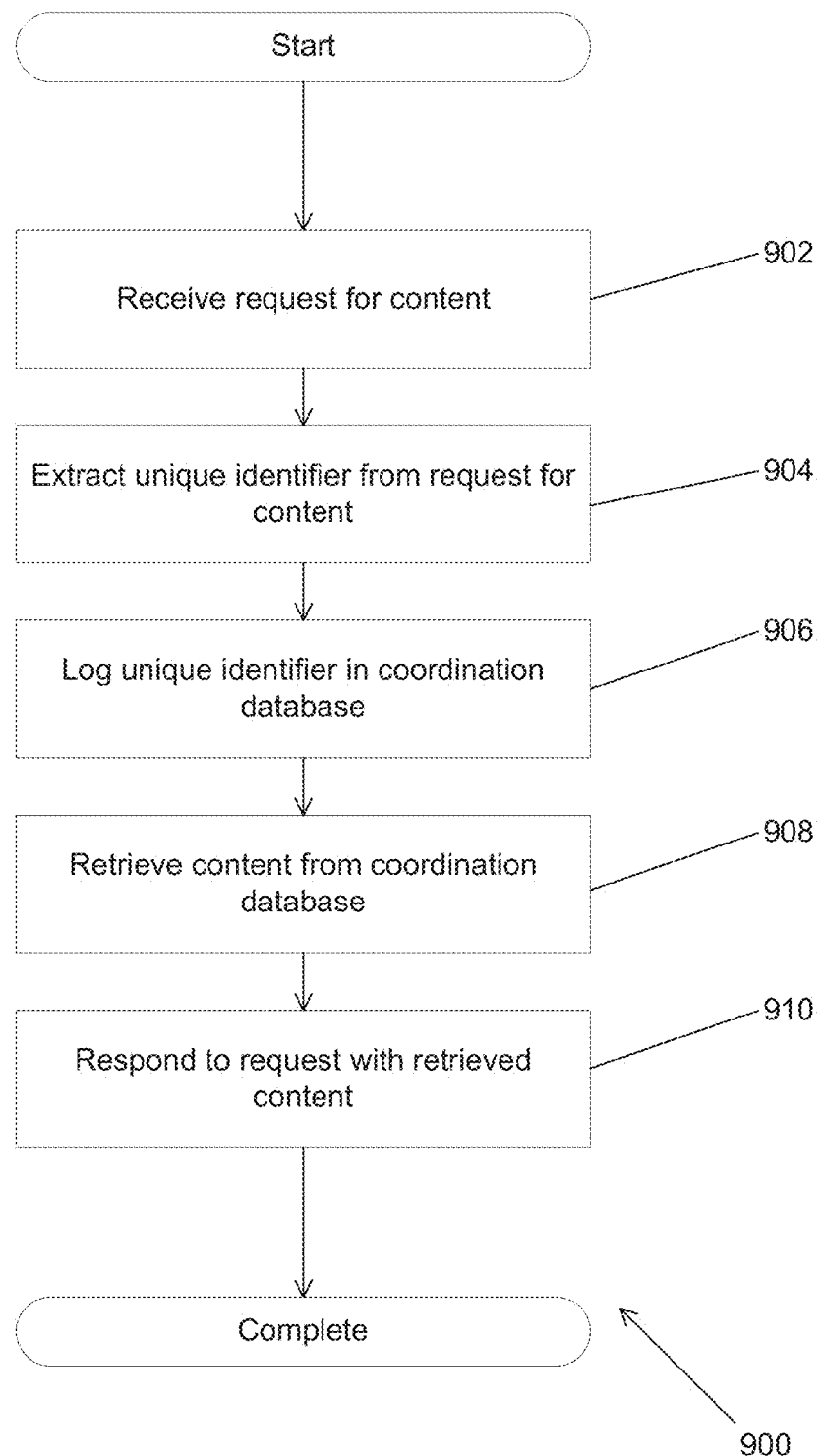
FIG. 9 illustrates a flow chart of a process for tracking interactions with content in accordance with an embodiment of the invention.

A coordination server system in accordance with many embodiments of the invention can track interactions with content utilizing unique identifying information incorporated within content posted to distribution platforms. A process for tracking interactions with content in accordance with an embodiment of the invention is illustrated in FIG. 9. In many embodiments, content posted to a distribution platform includes a link to additional content and includes unique identifying information. As discussed above, the unique identifying information can be any information capable of identifying interactions with content, such as but not limited to information embedded in a URL link, a beacon or cookies that can track both "clicks" as well as "views" of content. In several embodiments, the unique identifying information can be utilized in processes for tracking interactions with content distributed by a coordinated content distribution system. In the illustrated embodiment, the process 900 of tracking interactions with content using a coordination server system includes receiving (902) a request for additional content using a link including unique identifying information. In many embodiments, the link enables a user that accesses posted content to also access additional content that can be maintained by the distribution server system or by a third party. As discussed above, the additional content can be a document, website, a video or audio recording or any other content accessible by a user. The unique identifying information is extracted (904) and logged (906). In many embodiments, the coordination server system generates the unique identifying information and includes the unique identifying information in the links posted as part of the content posted to different distribution platforms. At the time of posting the content including the link, the coordination server system can associate the unique identifying information with the repeater account that facilitated the posting of the content, and/or the user account and/or distribution platform to which the content was posted and/or anything relevant to the tracking of interactions with content.

By logging (906) the unique identifying information, the coordination server system can track interactions with content. The additional information that is logged can include (but is not limited to) the geographic location/IP address of the user device, information collected from the user device requesting additional content and/or any other information that can be captured from a request for content by a user device.

As noted above, the link typically includes information that the coordination server system can dynamically associate with a specific piece of additional content. Stated another way, the link is not associated with a specific piece of content stored in a specific location. Instead, the coordination server determines the content to provide in response to the receipt of a request for content using the link. Accordingly, the content that is served in response to a link can be updated over time and/or dynamically generated in the manner disclosed herein. In the process illustrated in FIG. 9, the coordination server system determines the additional content to retrieve (908) in response to receipt of a request including the unique identifying information. In many embodiments, the process of retrieving (908) the additional content involves dynamically generating the content from a template (which can be identified by a link) and additional information identified using the unique identifying information. Information can also be inserted into the template from sources in a manner that is independent of the unique identifying information (e.g. time/date information). In this way, the coordination server system can respond (910) to the request for content with the retrieved static and/or dynamic content.

Although specific processes for tracking interactions with content and generation of dynamic content by utilizing unique identifying information are discussed above, any of a variety of processes can be utilized for tracking interactions with content in accordance with many different embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A coordinated content distribution system, comprising:
a coordination server system including one more processors and memory accessible by the one or more processors; and
instructions in the memory that direct the one or more processors to:
maintain a coordination database that stores information for at least one source account and
information for at least one repeater account wherein the information for a source account includes content posted by a source user to the source account of the user and one or more distribution rules for content posted to the source account wherein the one or more distribution rules include rules for distribution of content to one or more of the at least one repeater accounts and wherein information for each repeater account includes access information for one or more user accounts on one or more distribution platforms associated with the repeater account wherein the access information of a user account enables access via distribution platform associated with the user account to the user account maintained in the distribution platform;
receive uploaded content associated with a particular source account over a network from a source user device;
obtain a distribution rule associated with the received uploaded content from the information for the particular source account stored in the coordination database;
determine at least one repeater account associated with the uploaded content based on the distribution rule;
determine at least one user account of a distribution platform associated with the repeater account;
obtain the access information for the at least one user account of the distribution platform from the repeater account; and
post the uploaded content in at least one user account in a distribution platform associated with the one or more user accounts of the at least one repeater account according to at least one distribution rule of the particular source account for the uploaded content by accessing the user account of the distribution platform over the network using the access information from the repeater account information of the at least one determined repeater account.

2. The coordinated content distribution system of claim 1, wherein the distribution rule includes a distribution schedule that defines when content is posted to a user account in a distribution platform associated with a repeater account.

3. The coordinated content distribution system of claim 1, wherein the distribution rule includes a distribution trigger which defines an event, where content is posted to a user account in response to an occurrence of the event.

4. The coordinated content distribution system of claim 1, wherein the information for a source account further includes at least one set of modification permissions associated with the content posted to the source account wherein a modification permission indicates at least one repeater account allowed to modify content associated with the account.

5. The coordinated content distribution system of claim 4, wherein the instruction further direct the one more processor to receive modifications to the uploaded content and to associate the modified content with at least one repeater account in the coordination database based on the set of modification permissions.

6. The coordinated content distribution system of claim 4, wherein the instructions direct the one or more processors to receive a modification permission and to associate the modification permission with the uploaded content associated with the source account.

7. The coordinated content distribution system of claim 1, wherein the instructions further direct the one or more processor to obtain modified content associated with at least one repeater account from a user of the repeater account, over the network where the modified content is a modified version of the uploaded content and post the modified content in at least one user account in a distribution platform associated with the repeater account based upon the access information.

8. The coordinated content distribution system of claim 1, wherein the instructions direct the one or more processors to receive a distribution rule for a source account, store the received distribution rule in the information for the source account and associate the distribution rule with content associated with the source account.

9. The coordinated content distribution system of claim 1, wherein the instructions further direct the one or more processors to post modifications of the uploaded content to at least one user account of a distribution platform associated with a repeater account in accordance with a distribution rule in the source account information of the source account.

10. The coordinated content distribution system of claim 1, wherein the instructions direct the one or more processors to dynamically generate content for a source by inserting information into a template and post the dynamically generated content to a user account of a distribution platform associated with a repeater account indicated in a distribution rule for content in the source information of the source account using the access information of the user account in the repeater account information of the repeater account.

11. The coordinated content distribution system of claim 1, wherein the instructions further direct the one or more processors to track interactions with one more items of content associated with a particular source account.

12. The coordinated content distribution system of claim 11, wherein the one or more items of content include unique identifying information that enables interactions with the one or more items of content to be tracked.

13. The coordinated content distribution system of claim 1, wherein the posted content includes a link to additional content.

14. The coordinated content distribution system of claim 13, wherein the instructions further direct the one or more processor to dynamically generate the additional content using a template.

15. The coordinated content distribution system of claim 13, wherein the link is selected from the group consisting of a URL, a button or a number in an interactive voice response system.

16. The coordinated content distribution system of claim 13, wherein the posted content includes instructions to cause a user device to generate at least one request for the additional content from the coordination server system upon access of the uploaded content by the user, where the request includes unique identifying information for the additional content.

17. The coordinated content distribution system of claim 16, wherein the instructions direct the one or more processors to dynamically generate the additional content by inserting information into a template in response to receiving the request, where at least one piece of information inserted into the template is selected based upon the unique identifying information included in the request.

18. A coordination server system, comprising:
   memory; and
   a processing system wherein instructions in the memory configure the processing system to:
      maintain a coordination database that stores:
         information for at least one source account,
         information for at least one repeater account, and
         content associated with at least one source account,
         wherein information for a source account includes content posted by a source user to the source account of the user and one or more distribution rules for content posted to the source account wherein the one or more distribution rules include rules for distribution of content to one or more of the at least one repeater accounts and wherein information for each repeater account includes access information for one or more user accounts on one or more distribution platforms associated with the repeater account wherein the access information of a user account enables access via a distribution platform associated with the user account to the user account maintained in the distribution platform;
      receive uploaded content associated with a particular source account in the coordination database over a network;
      obtain a distribution rule associated with the received uploaded content from the information for the particular source account;
      determine at least one receiver account associated with the uploaded content based on the distribution rule;
      determine at least one user account of a distribution platform associated with the repeater account;
      obtain the access information for the at least one user account of the distribution platform from the repeater account; and
      post the uploaded content in the at least one user account of a distribution platform associated with the repeater account according to at least one distribution rule of the particular source account for the uploaded content by accessing the user account of the distribution platform over the network using the access information from the repeater account information of the repeater account.

19. A method for coordinated content distribution, the method comprising:
   receiving uploaded content associated with a particular source account in the coordination database over a network using a coordination server system;
   obtaining a distribution rule using the coordination server system wherein the distribution rule is associated with the received uploaded content and is from the information for the particular source account stored in a memory of the coordination server system wherein the distribution rule includes a rule for distribution of content to one or more of at least one repeater accounts maintained by the coordination server system;
   determine at least one receiver account associated with the uploaded content based on the distribution rule;
   determine at least one user account of a distribution platform associated with the at least one repeater account;
   obtain the access information for the at least one user account of a distribution platform from the determined at least one repeater account; and
   posting the uploaded content using the coordination server system into the at least one user account of a distribution platform according to the distribution rule using the access information in repeater account information stored by the coordination server system wherein the access information of a user account enables access via a distribution platform associated with the user account to the user account maintained in the distribution platform, where the distribution platform is configured to provide access to posted content in the user account.

* * * * *